United States Patent
Shiraki

(10) Patent No.: US 8,804,715 B2
(45) Date of Patent: Aug. 12, 2014

(54) COMMUNICATION PROCESSING APPARATUS AND ADDRESS LEARNING METHOD

(75) Inventor: Osamu Shiraki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 13/332,775

(22) Filed: Dec. 21, 2011

(65) Prior Publication Data

US 2012/0195308 A1 Aug. 2, 2012

(30) Foreign Application Priority Data

Feb. 2, 2011 (JP) ................................. 2011-021168

(51) Int. Cl.
*H04L 12/28* (2006.01)
*H04L 12/56* (2006.01)
*H04L 12/433* (2006.01)

(52) U.S. Cl.
CPC .................... *H04L 12/433* (2013.01)
USPC ........................................................ 370/389

(58) Field of Classification Search
CPC .................................................... H04L 12/433
See application file for complete search history.

(56) References Cited

U.S. PATENT DOCUMENTS

| | | | |
|---|---|---|---|
| 6,823,498 B2 * | 11/2004 | Downer et al. | 716/124 |
| 7,522,589 B2 * | 4/2009 | O'Neill et al. | 370/389 |
| 7,693,158 B1 * | 4/2010 | Carrie | 370/395.53 |
| 7,843,907 B1 * | 11/2010 | Abou-Emara et al. | 370/386 |
| 8,218,538 B1 * | 7/2012 | Chidambaram et al. | 370/386 |
| 2004/0095928 A1 * | 5/2004 | O'Neill et al. | 370/389 |
| 2004/0196853 A1 * | 10/2004 | Saito et al. | 370/395.21 |
| 2005/0097243 A1 * | 5/2005 | Yamashita et al. | 710/38 |
| 2007/0058602 A1 | 3/2007 | Shimada | |
| 2007/0121632 A1 * | 5/2007 | Zabarski | 370/392 |
| 2008/0259798 A1 * | 10/2008 | Loh et al. | 370/235 |
| 2010/0135307 A1 * | 6/2010 | Nakagawa | 370/395.53 |
| 2011/0200331 A1 * | 8/2011 | Li et al. | 398/45 |
| 2011/0271007 A1 * | 11/2011 | Wang et al. | 709/238 |
| 2013/0034096 A1 * | 2/2013 | Hu et al. | 370/389 |
| 2013/0151646 A1 * | 6/2013 | Chidambaram et al. | 709/213 |

FOREIGN PATENT DOCUMENTS

| | | |
|---|---|---|
| JP | 2007-081990 | 3/2007 |
| JP | 2010-130605 | 6/2010 |

* cited by examiner

*Primary Examiner* — Hassan Phillips
*Assistant Examiner* — Prenell Jones
(74) *Attorney, Agent, or Firm* — Staas & Halsey LLP

(57) ABSTRACT

A communication processing apparatus includes a first storage unit, a second storage unit, and a processor. The first storage unit stores, for each of a plurality of port identifiers, a port identifier and a network identifier in association with each other. The second storage unit stores address information and a set of port identifiers in association with each other. The processor extracts a first network identifier associated with a first port identifier for identifying a reception port from the first storage unit, extracts second port identifiers associated with the extracted first network identifier from the first storage unit, and stores source address information of the received data and a first set of port identifiers in association with each other in the second storage unit. The first set of port identifiers includes the first port identifier and the extracted second port identifiers.

11 Claims, 10 Drawing Sheets

FIG. 3

| PORT ID | NETWORK ID |
|---|---|
| P1 | 00000011 |
| P2 | 00000011 |
| P3 | 00000100 |
| P4 | 00001000 |
| P5 | 00010000 |
| P6 | 00100000 |

| PORT ID | PARTITION ID |
|---|---|
| P1 | 001101 |
| P2 | 110010 |
| P3 | 001101 |
| P4 | 001101 |
| P5 | 110010 |
| P6 | 110010 |

| ADDRESS | PORT ID |
|---|---|
| MAC_C | P3 |

14

⇓

| ADDRESS | PORT ID |
|---|---|
| MAC_C | P3 |
| MAC_A | P1, P2 |

14

FIG. 9
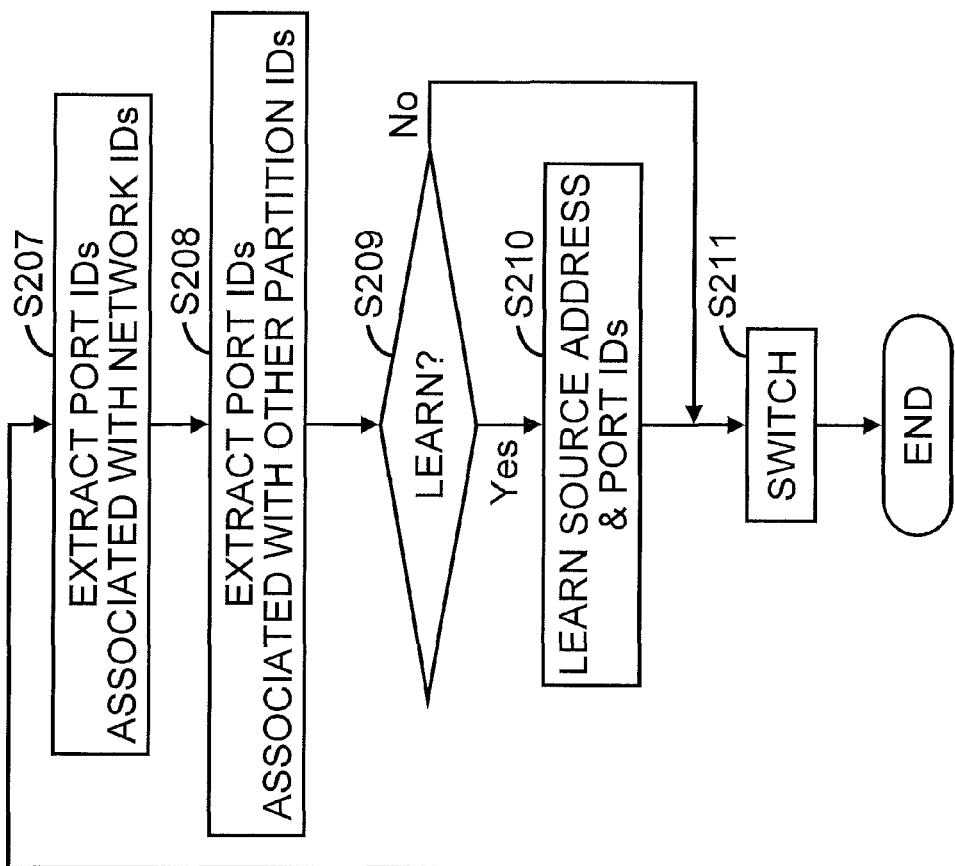
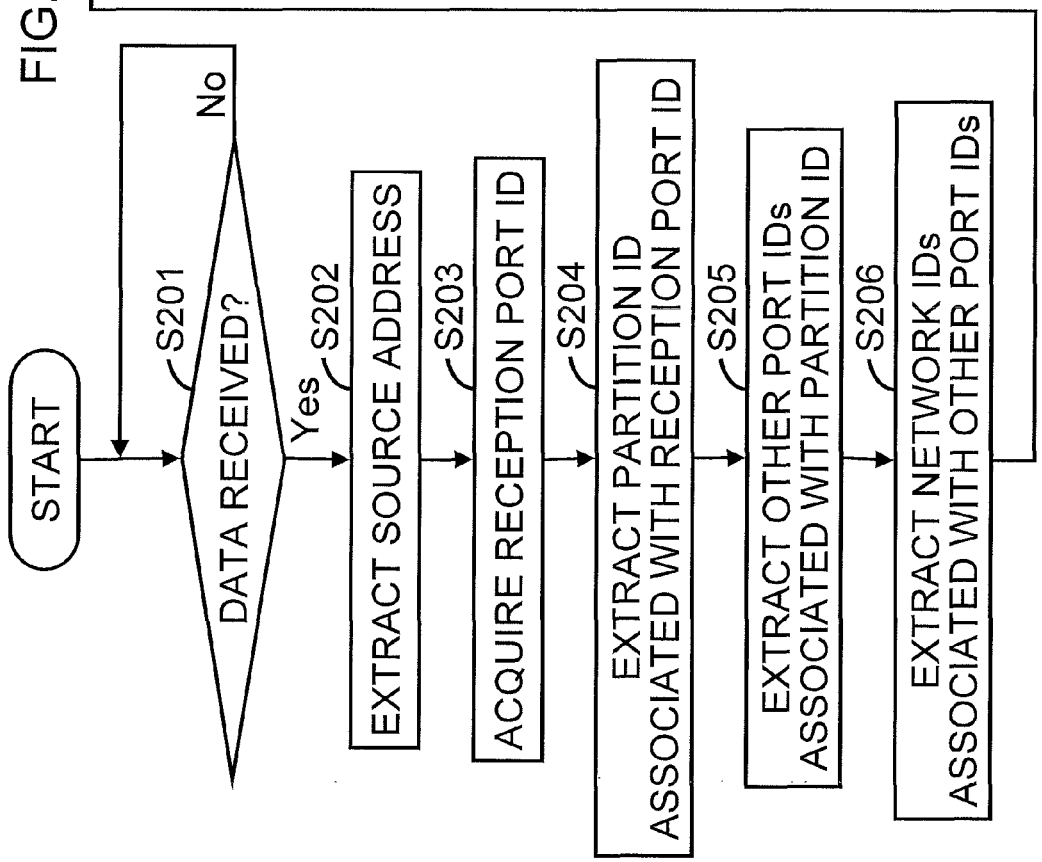

COMMUNICATION PROCESSING APPARATUS AND ADDRESS LEARNING METHOD

CROSS-REFERENCE TO RELATED APPLICATION

This application is based upon and claims the benefit of priority of the prior Japanese Patent Application No. 2011-021168, filed on Feb. 2, 2011, the entire contents of which are incorporated herein by reference.

FIELD

The embodiments discussed herein are related to a communication processing apparatus and an address learning method.

BACKGROUND

Currently, in a frame exchange network such as Ethernet (registered trademark), a switch that relays data may employ partitioning, in which the switch may operate as if it were two switches. In the partitioning of a switch, a single switch is logically divided and caused to function as a plurality of switches. Thus, the partitioning of a switch may be referred to as virtualization of a switch.

A switch employing the partitioning may have a problem during a data relay process when the same network is connected to a plurality of partitions of the switch that has been logically divided. FIG. 12 illustrates exemplary partitioning of a switch. As illustrated in FIG. 12, a switch 50 has ports P1 to P6. Here, a "port Pn" (n is a natural number) refers to a port identified by a port identifier (ID) "Pn". The ports P1, P3, and P4 together form partition PT1. The ports P2, P5, and P6 together form partition PT2. Here, a "partition PTn" (n is a natural number) refers to a partition identified by a partition ID "Pn".

The switch 50 is connected, via the ports P1 and P2, to a network to which an apparatus A having a media access control (MAC) address "MAC_A" is connected. That is, the switch 50 is connected to the same network via the ports P1 and P2, which belong to different partitions, respectively. In addition, the switch 50 is connected, via the port P4, to a network to which an apparatus B having a MAC address "MAC_B" is connected.

For example, upon receiving data transmitted from the apparatus A via the port P1, the switch 50 illustrated in FIG. 12 learns the address "MAC_A" and the port ID "P1", that is, the switch 50 stores the address "MAC_A" in association with the port ID "P1" in an address table or the like. In this state, upon receiving data destined for the address "MAC_A" via the port P6 which belongs to the partition PT2, the switch 50 searches the address table and extracts the port ID "P1", which has been learned in association with the address "MAC_A". In this case, since the port P6 and the port P1 belong to different partitions, the switch 50 is not allowed to relay the data received via the port P6.

On the other hand, upon receiving data transmitted from the apparatus B via the port P4, the switch 50 illustrated in FIG. 12 stores the address "MAC_B" in association with the port ID "P4" in the address table or the like. In this state, upon receiving data destined for the address "MAC_B" via the port P6 which belongs to the partition PT2, the switch 50 searches the address table and extracts the port ID "P4" which has been learned in association with the address "MAC_B". In this case, since the port P6 and the port P4 belong to different partitions, the switch 50 is not allowed to relay the data received via the port P6.

As methods for solving such a problem, a method for invalidating the learning, a method for invalidating the search, and a method for learning partition information are known. The method for invalidating the learning is a method in which learning of an address is not executed when data has been received via one of ports that are connected to the same network. For example, in the case of the switch 50 illustrated in FIG. 12, the switch 50 does not learn an address when data has been received via the port P1 or P2. On the other hand, when data has been received via any of the ports P3 to P6, the switch 50 stores a source address of the data in association with a port ID of the reception port in the address table.

The method for invalidating the search is a method in which an address is learned when data has been received but results of the learning are not searched for when data has been received via a port while communication between partitions is supposed to be performed. For example, in the case of the switch 50 illustrated in FIG. 12, upon receiving data transmitted from the apparatus B via the port P4, the switch 50 stores the address "MAC_B" in association with the port ID "P4" in the address table or the like. Thereafter, upon receiving data destined for the address "MAC_B" via the port P3, the switch 50 causes flooding in which the data is transferred to the ports P1 and P4 which belong to the same partition as that the port P3 belongs to, namely partition PT1, without searching the address table. Similarly, upon receiving data destined for the address "MAC_B" via the port P6, the switch 50 causes flooding in which the data is transferred to the ports P2 and P5 which belong to the same partition as that the port P6 belongs to, namely partition PT2, without searching the address table.

The method for learning partition information is a method in which information regarding a partition to which a reception port belongs is also learned when an address and a port ID of the reception port are learned. For example, in the case of the switch 50 illustrated in FIG. 12, upon receiving data transmitted from the apparatus A via the port P1, the switch 50 stores the address "MAC_A", the port ID "P1", and partition ID "PT1" in association with one another in the address table or the like. Thereafter, upon receiving data destined for the address "MAC_A" via the port P4 which belongs to partition PT1, the switch 50 searches the address table and identifies the port P1 to which the data is to be output, and then transfers the data via the port P1. Upon receiving data destined for the address "MAC_A" via the port P6 which belongs to partition PT2, the switch 50 searches the address table and determines that a port to which the data is to be output has not been learned. The switch 50 then causes flooding, that is, transfers the data to the ports P2 and P5 which belong to the same partition as that the port P6 belongs to, namely partition PT2.

Japanese Laid-open Patent Publication No. 2010-130605 discloses a related technique.

SUMMARY

According to an aspect of the present invention, provides is a communication processing apparatus including a first storage unit, a second storage unit, and a processor. The first storage unit stores, for each of a plurality of port identifiers, a port identifier and a network identifier in association with each other. The port identifier is for identifying one port among a plurality of ports. The network identifier is for identifying a network connected to the one port. The second storage unit stores address information and a set of port identifiers in association with each other. The address information is of an apparatus connected to the one port. The set of port identifiers includes the port identifier for identifying the one port. The processor extracts, upon receiving data via a reception port among the plurality of ports, a first network identifier associated with a first port identifier for identifying the reception port from the first storage unit, and extracts second port identifiers associated with the extracted first network identifier from the first storage unit. Each of the second port identifiers is different from the first port identifier. The processor further stores source address information of the received data and a first set of port identifiers in association with each other in the second storage unit. The source address information is address information of an apparatus that has transmitted the received data. The first set of port identifiers includes the first port identifier and the extracted second port identifiers.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 3 is a diagram illustrating exemplary information stored in a network ID table according to an embodiment of the present invention;

FIG. 4 is a diagram illustrating exemplary information stored in a partition ID table according to an embodiment of the present invention;

FIG. 5 is a diagram illustrating exemplary information stored in an MAC table according to an embodiment of the present invention;

FIG. 9 is a diagram illustrating an exemplary operation flow of a learning process executed by a switch according to an embodiment of the present invention;

DESCRIPTION OF EMBODIMENTS

Conventional techniques do not allow a communication processing apparatus to execute an efficient data relay process in which flooding is prevented.

For example, in the method for invalidating the learning, since a source address is not learned in association with a port ID of a reception port when data has been received, flooding is undesirably caused every time the data is received, in which data is transmitted from all ports in the same partition as that the reception port belongs to. Therefore, in the case of a switch adopting the method for invalidating the learning, flooding is caused when data is relayed, thereby causing the performance to degrade.

In the method for invalidating the search, a source address and a port ID of a reception port are learned in association with each other when data has been received, but the address table is not searched when data has been received. As a result, flooding is undesirably caused every time the data is received, in which data is transmitted from all ports in the same partition as that the reception port belongs to. Therefore, in the case of a switch adopting the method for invalidating the search, flooding is caused when data is relayed, thereby causing the performance to degrade.

In the method for learning partition information, the source address is repeatedly learned as different pieces of data when a reception port belongs to a different partition even if the source address of the received data has already been learned. Therefore, in the case of a switch adopting the method for learning partition information, although the occurrence frequency of flooding may be reduced compared to a switch adopting the method for invalidating the learning or the method for invalidating the search, the switch may not be efficient since address information is learned for each partition. In addition, since a region for storing the partition information is necessary in the address table, the size of the address table undesirably increases compared to a case in which the partition information is not recorded.

It is preferable to provide a communication processing apparatus and an address learning method for executing a data relay process in which flooding may be suppressed.

The embodiments provide a communication processing apparatus and an address learning method for executing a data relay process in which flooding may be suppressed.

Embodiments will be discussed hereinafter in detail with reference to the drawings. It is to be understood that the embodiments are not limited to the following embodiments.

First Embodiment

Figure 1:
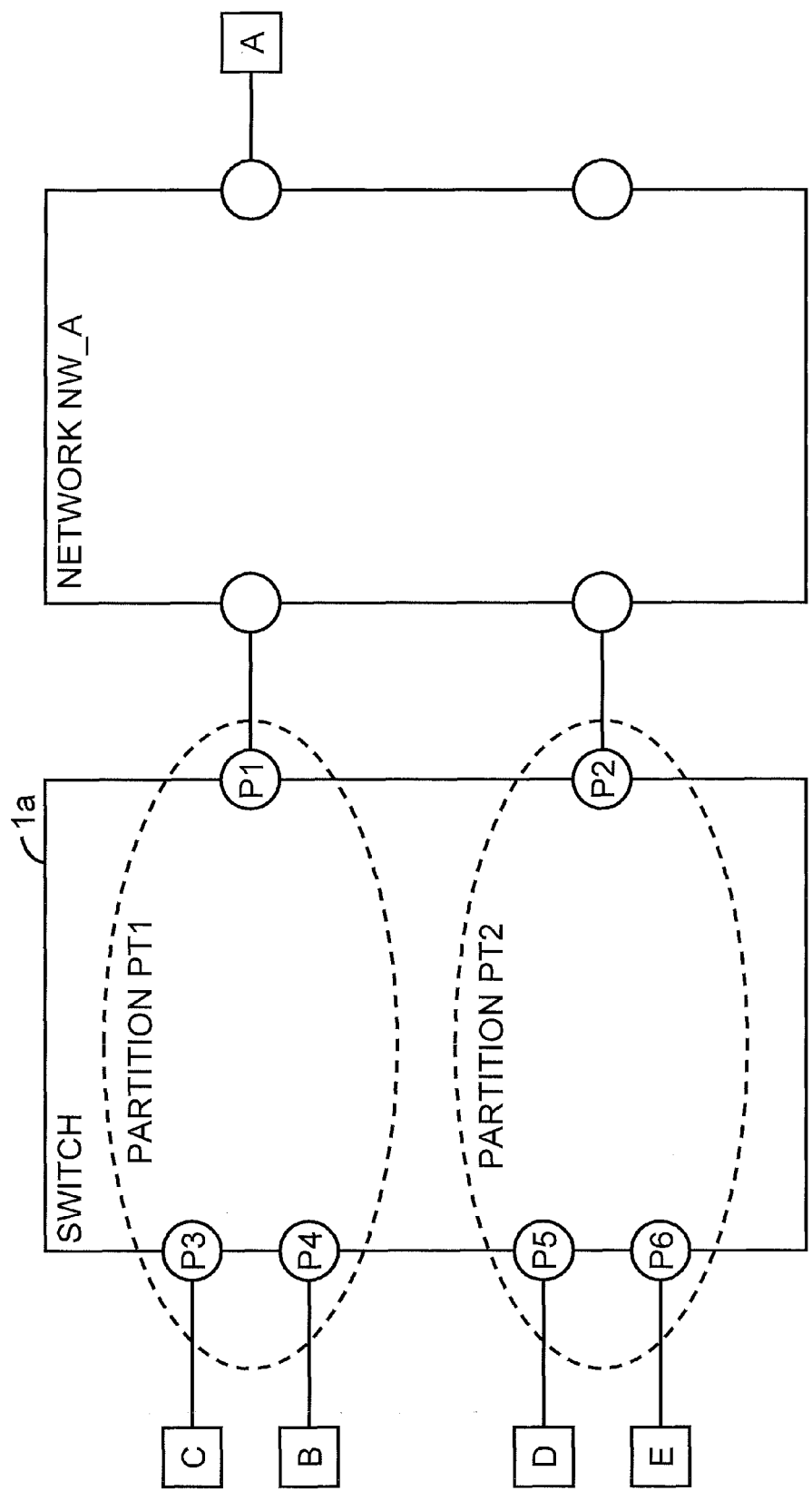
FIG. 1 is a diagram illustrating an exemplary network system that includes a switch according to an embodiment of the present invention.

FIG. 1 illustrates an exemplary network system that includes a switch according to a first embodiment. A switch 1a illustrated in FIG. 1 is a data relay apparatus that relays received data to a destination, such as an layer 2 (L2) switch, a switching hub, an layer 3 (L3) switch, a router, or a server having a switching function.

The switch 1a illustrated in FIG. 1 is connected, via a port P1 and a port P2, to a network NW_A to which an apparatus A, such as a server, having a MAC address "MAC_A" is connected. The switch 1a is connected to an apparatus C having a MAC address "MAC_C" via a port P3. The switch 1a is connected to an apparatus B having a MAC address "MAC_B" via a port P4. The switch 1a is connected to an apparatus D having a MAC address "MAC_D" via a port P5. The switch 1a is connected to an apparatus E having a MAC address "MAC_E" via a port P6. It is to be noted that the apparatuses A to E are not limited to servers, and may be, for example, data relay apparatuses such as switches, or computers.

In the switch 1a, the ports P1, P3, and P4 together form partition PT1 and the ports P2, P5, and P6 together form partition PT2. Thus, since the switch 1a employs partitioning, communication between the partitions is not allowed to be executed. For example, the switch 1a is not allowed to transfer data received via the port P1 to any of the ports P2, P5, and P6. In addition, the switch 1a is not allowed to transfer data received via the port P5 to any of the ports P1, P3, and P4.

The switch 1a includes a first storage unit that stores, for a plurality of port IDs, information regarding corresponding relationship between a port ID and a network ID for identifying a network connected to a port identified by the port ID. The switch 1a also includes a second storage unit that stores address information of an apparatus in association with a port ID of a port to which the apparatus is connected. Upon receiving data, the switch 1a extracts a network ID stored in the first storage unit in association with a port ID (referred to as a reception port ID) of a reception port via which the data has been received. The switch 1a extracts port IDs, other than the reception port ID, stored in the first storage unit in association with the extracted network ID. The switch 1a then stores address information (source address information) of a source of the data, the extracted port IDs, and the reception port ID in association with one another in the second storage unit.

Thus, in the address learning upon receiving data, the switch 1a according to the present embodiment learns a source address of the data, a port ID of the reception port, and port IDs of other ports connected to the same network as that the reception port is connected to, in association with one another. For example, suppose that the switch 1a has received, via the port P1, data DT_A having a source address "MAC_A". In this case, the switch 1a also learns the port ID "P2" of the port P2 which is connected to the same network as that the port P1 is connected to, namely the network NW_A, in association with the port ID "P1" of the reception port P1 and the source address "MAC_A".

Therefore, upon receiving data having a destination address "MAC_A" via the port P5, the switch 1a may identify the port P2 as a destination port, which belongs to a partition different from the reception port P1 which has received the data DT_A having the source address "MAC_A". That is, even when the switch 1a receives data having a learned address as a destination address via a port which belongs to a partition different from that the reception port of the data having the learned address belongs to, the switch 1a does not cause flooding. As a result, the switch 1a may execute an efficient data relay process in which flooding is prevented.

Second Embodiment

In a second embodiment, a detailed example of the switch 1a illustrated in FIG. 1 will be discussed. In the present embodiment, a functional configuration of the switch, an operation flow of a learning process executed by the switch, and advantageous effects of the present embodiment will be discussed in this order.

Functional Configuration of Switch

Figure 2:
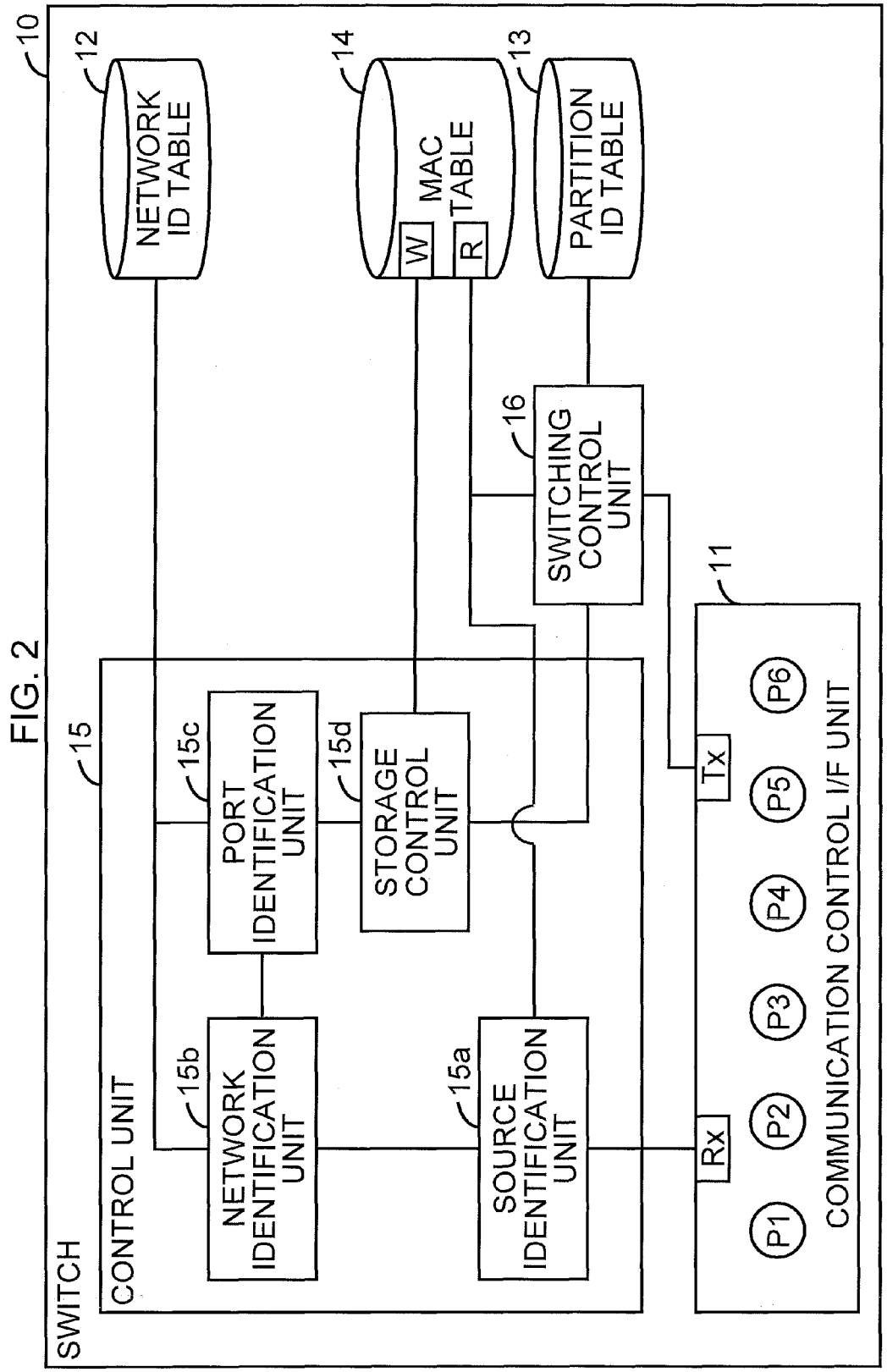
FIG. 2 is a diagram illustrating an exemplary functional configuration of a switch according to an embodiment of the present invention.

FIG. 2 illustrates an exemplary functional configuration of a switch according to the present embodiment. As illustrated in FIG. 2, a switch 10 includes a communication control interface (I/F) unit 11, a network ID table 12, a partition ID table 13, an MAC table 14, a control unit 15, and a switching control unit 16.

The control unit 15 and each unit included in the control unit 15 may be integrated circuits or electronic circuits. The network ID table 12, the partition ID table 13, and the MAC table 14 may be storage apparatuses such as semiconductor devices or hard disks.

The communication control I/F unit 11 includes ports P1 to P6 identified by port IDs "P1" to "P6", respectively. The communication control I/F unit 11 is an interface that controls communication with other apparatuses. The communication control I/F unit 11 receives data via a certain port and outputs the received data to a source identification unit 15a, which will be discussed later. The communication control I/F unit 11 transmits data output from the switching control unit 16 to a destination via a certain port. "Rx" illustrated in FIG. 2 indicates the type of interface for receiving data such as a packet or a frame, and "Tx" indicates the type of interface for transmitting data.

The network ID table 12 stores, for a plurality of port IDs, information regarding corresponding relationship between a port ID and a network ID for identifying a network connected to a port identified by the port ID. FIG. 3 illustrates exemplary information stored in the network ID table 12 according to the present embodiment. As illustrated in FIG. 3, the network ID table 12 stores "P1, 00000011", "P2, 00000011", "P3, 00000100", "P4, 00001000", "P5, 00010000", "P6, 00100000", and the like as the information of the port ID and the network ID associated with each other.

The port IDs stored here are identifiers that identify the ports P1 to P6 included in the communication control I/F unit 11. The network IDs stored here are identifiers that identify networks to which the ports P1 to P6 included in the communication control I/F unit 11 are connected.

In the example illustrated in FIG. 3, the port P1 identified by the port ID "P1" is connected to the network identified by the network ID "00000011". The port P2 identified by the port ID "P2" is connected to the network identified by the network ID "00000011". The port P3 identified by the port ID "P3" is connected to the network identified by the network ID "00000100". The port P4 identified by the port ID "P4" is connected to the network identified by the network ID "00001000". The port P5 identified by the port ID "P5" is connected to the network identified by the network ID "00010000". The port P6 identified by the port ID "P6" is connected to the network identified by the network ID "00100000". That is, the ports P1 and P2 are connected to the same network and the other ports are connected to different networks.

The partition ID table 13 stores a port ID that identifies a port in association with a partition ID that identifies a partition to which the port belongs. FIG. 4 illustrates exemplary information stored in the partition ID table 13 according to the present embodiment. As illustrated in FIG. 4, the partition ID table 13 stores "P1, 001101", "P2, 110010", "P3, 001101", "P4, 001101", "P5, 110010", "P6, 110010", and the like as the information of the port ID and the partition ID associated with each other.

The port IDs to be stored here are identifiers that identify the ports P1 to P6 included in the communication control I/F unit 11. The partition IDs to be stored here are identifiers that identify the partitions to which the ports P1 to P6 included in the communication control I/F unit 11 belong.

In the example of FIG. 4, the port P1 identified by the port ID "P1" belongs to the partition identified by the partition ID "001101", and the port P2 identified by the port ID "P2" belongs to the partition identified by the partition ID "110010". The port P3 identified by the port ID "P3" belongs to the partition identified by the partition ID "001101", and the port P4 identified by the port ID "P4" belongs to the partition identified by the partition ID "001101". The port P5 identified by the port ID "P5" belongs to the partition identified by the partition ID "110010", and the port P6 identified by the port ID "P6" belongs to the partition identified by the partition ID "110010". That is, the ports P1, P3, and P4 belong to the same partition, namely the partition identified by the partition ID "001101", and the ports P2, P5, and P6 belong to the same partition, namely the partition identified by the partition ID "110010".

The MAC table 14 stores address information of an apparatus connected to ports of the switch 10 and port IDs of the ports in association with each other. FIG. 5 illustrates exemplary information stored in the MAC table 14 according to the present embodiment. Information is registered in the MAC table 14 each time the information is learned. The left part of FIG. 5 illustrates a state before the address "MAC_A" is learned, and the right part of FIG. 5 illustrates a state after the address "MAC_A" is learned. "W" illustrated in FIG. 2 indicates the type of interface for writing data, and "R" indicates the type of interface for reading data.

As illustrated in FIG. 5, the MAC table 14 stores "MAC_C, P3" or the like as information regarding an address and a port ID associated with each other. The address to be stored here is an MAC address of an apparatus, and the port ID to be stored here is a port ID of a destination port of data destined for the MAC address. For example, when "MAC_C, P1" is stored, data destined for the address "MAC_C" is sent to the port P1.

The control unit 15 includes the source identification unit 15a, a network identification unit 15b, a port identification unit 15c, and a storage control unit 15d. The control unit 15 executes address learning by using these units. The control unit 15 may include an internal memory that stores control programs, programs that define various processing procedures, and required data.

Upon receiving data, the source identification unit 15a extracts the source address of the data. For example, upon receiving the data DT_A having the source address "MAC_A" via the port P1, the source identification unit 15a extracts the source address "MAC_A" from the header or the like of the data DT_A. The source identification unit 15a then outputs the extracted source address "MAC_A" and the data DT_A to the network identification unit 15b.

Upon receiving data, the network identification unit 15b extracts, from the network ID table 12, a network ID associated with a reception port ID. An example will be discussed in which the data DTA having the source address "MAC_A" is received via the port P1 and the source identification unit 15a outputs the extracted source address "MAC_A" and the received data DT_A to the network identification unit 15b.

In this case, the network identification unit 15b extracts, from the network ID table 12, the network ID "00000011" associated with the port ID "P1". Thereafter, the network identification unit 15b outputs the reception port ID "P1", the data DT_A having the source address "MAC_A", the network ID "00000011", and the like to the port identification unit 15c.

The port identification unit 15c extracts, from the network ID table 12, a port ID associated with the network ID extracted by the network identification unit 15b. In the case of the above-mentioned example, the port identification unit 15c receives the reception port ID "P1", the data DT_A having the source address "MAC_A", and the network ID "00000011" from the network identification unit 15b. The port identification unit 15c then extracts, from the network ID table 12, a port ID other than the reception port ID "P1", from among port IDs associated with the received network ID "00000011", namely the port ID "P2". Thereafter, the port identification unit 15c outputs the reception port ID "P1", the extracted port ID "P2", the source address "MAC_A", the data DT_A, the network ID "00000011", and the like to the storage control unit 15d.

When the information such as the source address received from the port identification unit 15c has not been learned or learned data needs to be updated, the storage control unit 15d learns the received information and then outputs the information to the switching control unit 16. When the information such as the source address received from the port identification unit 15c has already been learned and does not need to be updated, the storage control unit 15d outputs the received information to the switching control unit 16 without learning the received information.

For example, suppose that the storage control unit 15d has received the port ID "P1", the port ID "P2", the source address "MAC_A", the data DT_A, and the network ID "00000011" when the MAC table 14 stores "MAC_C, P3" as illustrated in the left part of FIG. 5. In this case, since information regarding the correspondence between the source address "MAC_A" and the port IDs "P1" and "P2" is not stored in the MAC table 14, the storage control unit 15d determines that the information such as the address received from the port identification unit 15c has not been learned. The storage control unit 15d then stores "MAC_A, P1, P2" in the MAC table 14 as a new record indicating the address and the port IDs as illustrated in the right part of FIG. 5.

Thereafter, the storage control unit 15d sends the information such as the data and the address received from the port identification unit 15c to the switching control unit 16. As a result, upon receiving data destined for the address "MAC_A", the switching control unit 16 may transfer the data from the port P1 or port P2, whichever belongs to the same partition as that the reception port belongs to.

When the port IDs and the source address received from the port identification unit 15c have been stored in the MAC table 14 in association with each other, the storage control unit 15d determines that the received information has been learned. Upon determining that the information has been learned, the storage control unit 15d sends the information such as the data and the address received from port identification unit 15c to the switching control unit 16 without learning the received information.

Suppose that the storage control unit 15d has received the port IDs "P3" and "P1" and data DT_C having source address "MAC_C" from the port identification unit 15c when the MAC table 14 is in the state illustrated in the left part of FIG. 5. In this case, since information regarding the address "MAC_C" is stored in the MAC table 14 but the stored port ID is different from the received port IDs, the storage control unit 15d determines that the learned data needs to be updated. The storage control unit 15d then overwrites "MAC_C, P3", which is the address and the port ID that have already been stored, with "MAC_C, P1, P3". Thereafter, the storage control unit 15d sends such information as the data and the address received from the port identification unit 15c to the switching control unit 16.

The switching control unit 16 illustrated in FIG. 2 switches the data, that is, transfers the received data to the destination. Specifically, when the destination address of the received data has been learned, the switching control unit 16 transmits the data from one of learned ports that belongs to the same partition as that the reception port belongs to. When the destination address of the received data has not been learned, the switching control unit 16 causes flooding to ports that belong to the same partition as that the reception port belongs to.

For example, upon receiving data destined for the address "MAC_A" and a reception port ID "P4" from the storage control unit 15d, the switching control unit 16 refers to the MAC table 14 illustrated in the right part of FIG. 5 and extracts the port IDs "P1" and "P2" associated with the destination address "MAC_A". The switching control unit 16 then refers to the partition ID table 13 and extracts the partition ID "001101" associated with the reception port ID "P4".

Furthermore, the switching control unit 16 refers to the partition ID table 13 and extracts the partition IDs "001101" and "110010" respectively associated with the port IDs "P1" and "P2" extracted from the MAC table 14.

The switching control unit 16 then identifies, among the port IDs "P1" and "P2", the port ID "P1" associated with the same partition ID "001101" as that associated with the reception port ID "P4". Thereafter, the switching control unit 16 transmits the data via the port P1.

Upon receiving data destined for the address "MAC_B" and a reception port ID "P2" from the storage control unit 15*d*, the switching control unit 16 refers to the MAC table 14 illustrated in the right part of FIG. 5. Since the destination address "MAC_B" has not been stored, the switching control unit 16 determines that the information has not been learned. Therefore, the switching control unit 16 refers to the partition ID table 13 and extracts the partition ID "110010" associated with the reception port ID "P2". Furthermore, the switching control unit 16 refers to the partition ID table 13 and extracts the port IDs "P2", "P5", and "P6" associated with the partition ID "110010". Thereafter, the switching control unit 16 transmits the data via the ports identified by the extracted port IDs other than the reception port ID "P2", namely the port IDs "P5", and "P6".

Operation Flow of Learning Process Executed by Switch

Figure 6:
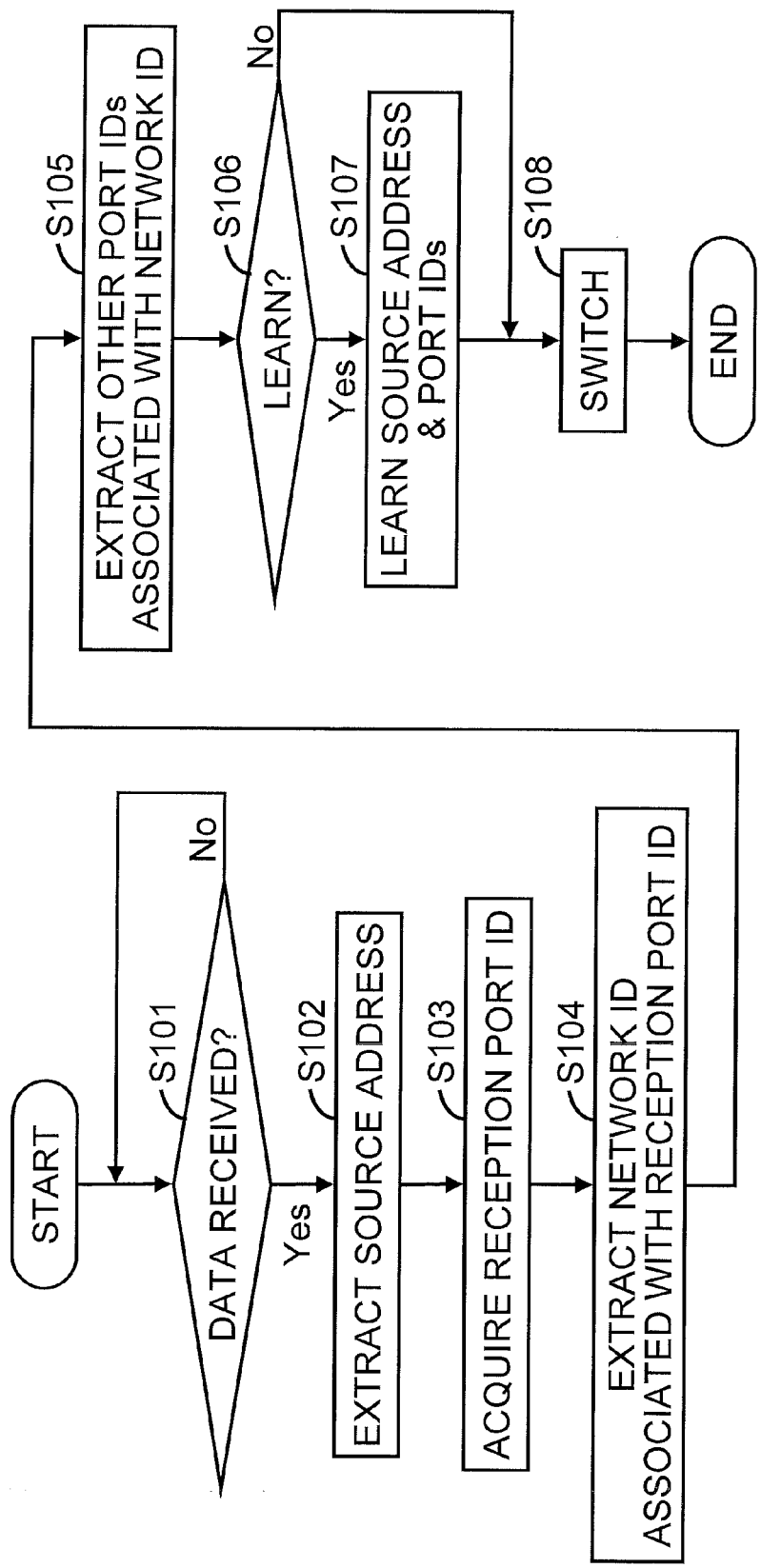
FIG. 6 is a diagram illustrating an exemplary operation flow of a learning process executed by a switch according to an embodiment of the present invention.

FIG. 6 illustrates an exemplary operation flow of a learning process executed by the switch according to the present embodiment.

In S101, the source identification unit 15*a* of the switch 10 waits for receiving data.

In S102, upon receiving data ("Yes" in S101), the source identification unit 15*a* extracts a source address from the received data. At this time, the source identification unit 15*a* may identify a reception port via which the received data has been received, by identifying a source port that has transferred the received data to the source identification unit 15*a* or by referring to the header of the received data or the like.

In S103, the network identification unit 15*b* acquires a reception port ID of the reception port via which the data has been received.

In S104, extracts a network ID associated with the reception port ID from the network ID table 12.

In S105, the port identification unit 15*c* extracts port IDs, other than the reception port ID, associated with the extracted network ID from the network ID table 12.

In S106, the storage control unit 15*d* determines whether the received data needs to be learned, that is, whether the source address of the received data has not been learned or whether the learned data needs to be updated.

In S107, when it has been determined that the source address has not been learned or that the learned data needs to be updated ("Yes" in S106), the storage control unit 15*d* learns the source address and port IDs.

When it has been determined that the source address has been learned and that the learned data does not need to be updated ("No" in S106), the switch 10 advances the process to S108 without executing S107.

In S108, the switching control unit 16 switches the data, that is, transmits the data to the destination. For example, when the destination address of the data received by the switch 10 has been learned, the switching control unit 16 extracts corresponding port IDs from the MAC table 14 and transmits the data from a port identified by one of the extracted port IDs, which is associated with the same partition ID as that associated with the reception port ID in the partition ID table 13. When the destination address of the data received by the switch 10 has not been learned, the switching control unit 16 transmits the data by causing flooding.

Advantageous Effects of Second Embodiment

According to the second embodiment, when learning an address, the switch 10 may learn, in addition to a reception port, other ports connected to the same network as that the reception port is connected to, in association with the address. Therefore, even when data destined for a learned address has been received via a port that belongs to a partition different from one to which the reception port belongs, the switch 10 may identify the destination port, thereby making it unnecessary to cause flooding. As a result, it is possible to execute an efficient data relay process in which flooding is prevented.

Third Embodiment

According to the second embodiment, the switch 10 learns, in addition to a reception port, other ports connected to the same network as that the reception port is connected to, in association with the address. However, the embodiments are not limited to this. In the third embodiment, an example in which a switch learns, in addition to a reception port, ports connected to the same network as that ports which belong to the same partition as that the reception port belongs to will be discussed. It is assumed that the connection relationship of the switch is the same as that illustrated in FIG. 1. In the present embodiment, a functional configuration of the switch, an operation flow of a learning process executed by the switch, and advantageous effects of the present embodiment will be discussed in this order.

Functional Configuration of Switch

Figure 7:
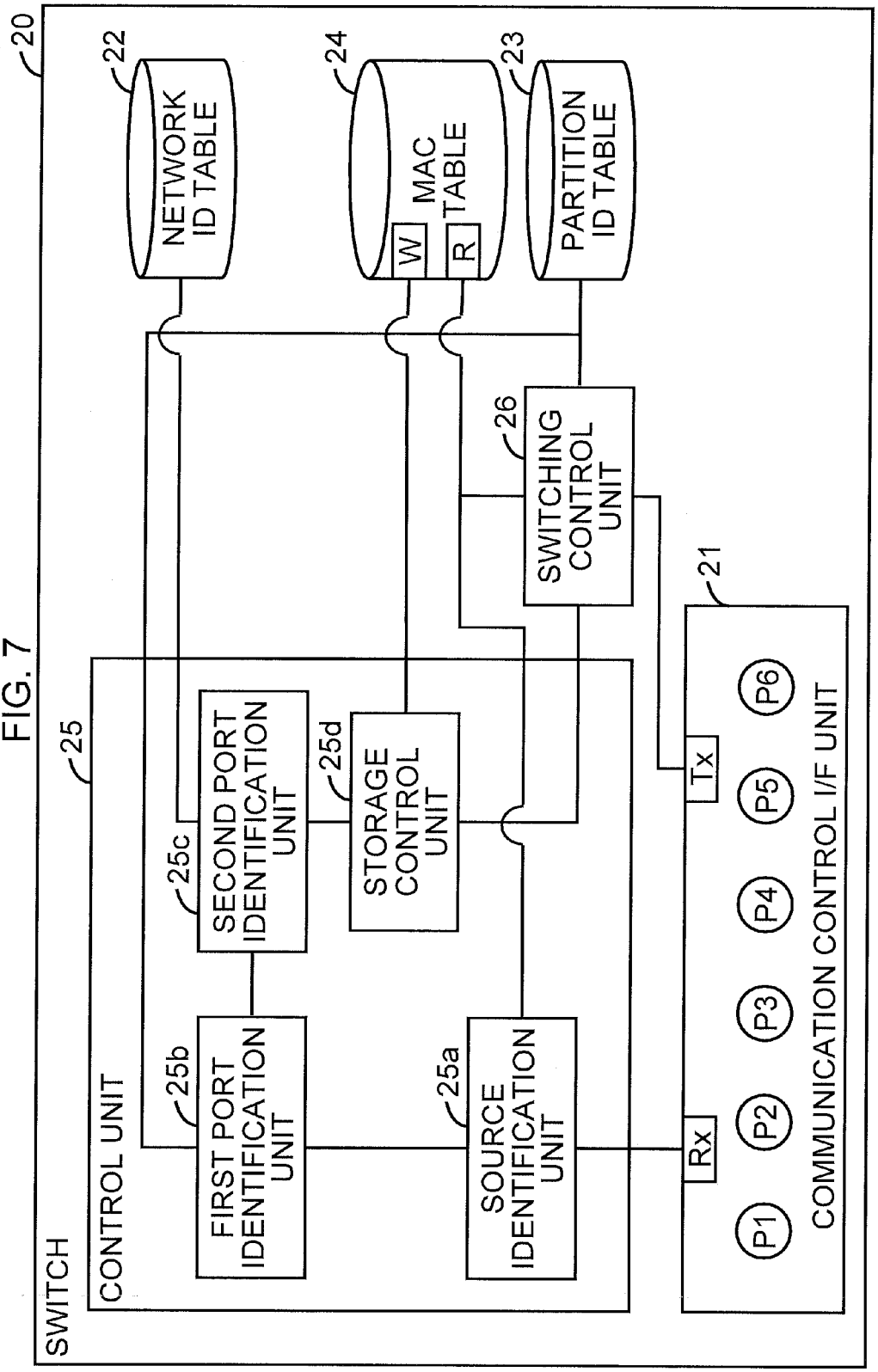
FIG. 7 is a diagram illustrating an exemplary functional configuration of a switch according to an embodiment of the present invention.

FIG. 7 illustrates an exemplary functional configuration of a switch according to the present embodiment. As illustrated in FIG. 7, a switch 20 includes a communication control I/F unit 21, a network ID table 22, a partition ID table 23, a MAC table 24, a control unit 25, and a switching control unit 26.

The control unit 25 and each unit included in the control unit 25 may be integrated circuits or electronic circuits. The network ID table 22, the partition ID table 23, and the MAC table 24 may be storage apparatuses such as semiconductor devices or hard disks.

The communication control I/F unit 21 includes, similarly to the second embodiment, ports P1 to P6 identified by port IDs "P1" to "P6", respectively. The communication control I/F unit 21 is an interface that controls communication with other apparatuses.

The network ID table 22 stores a port ID for identifying a port in association with a network ID for identifying a network to which the port is connected. Information stored in the network ID table 22 may be the same as that illustrated in FIG. 3, which is discussed in the second embodiment, and therefore detailed discussion thereof is omitted here.

The partition ID table 23 stores a port ID for identifying a port in association with a partition ID for identifying a partition to which the port belongs. Information stored in the partition ID table 23 may be the same as that illustrated in FIG. 4, which is discussed in the second embodiment, and therefore detailed discussion thereof is omitted here.

Figure 8:
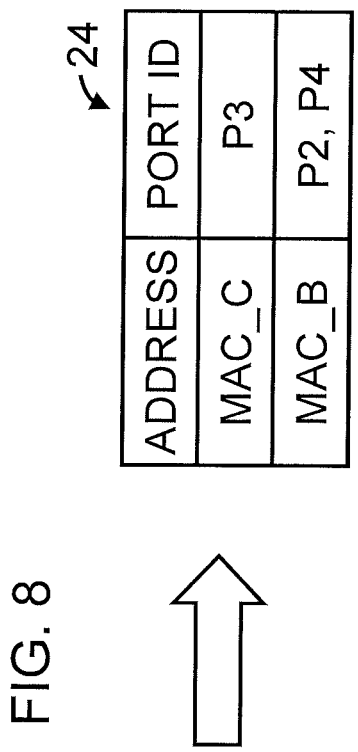
FIG. 8 is a diagram illustrating exemplary information stored in an MAC table according to an embodiment of the present invention.

The MAC table 24 stores a port ID in association with address information of apparatuses connected to a port identified by the port ID. FIG. 8 illustrates exemplary information stored in the MAC table 24 according to the present embodiment. The left part of FIG. 8 illustrates a state before the address "MAC_B" is learned, and the right part of FIG. 8 illustrates a state after the address "MAC_B" is learned. That is, information is registered in the MAC table 24 each time the information is learned. As illustrated in FIG. 8, the MAC table 24 stores "MAC_C, P3" or the like as information of an address and a port ID associated with each other. The address and the port ID stored here may be the same as those illustrated in FIG. 5, which is discussed in the second embodiment, and therefore detailed discussion thereof is omitted.

The control unit 25 includes a source identification unit 25a, a first port identification unit 25b, a second port identification unit 25c, and a storage control unit 25d. The control unit 25 is a control unit executes address learning by using these units. The control unit 25 may include an internal memory that stores control programs, programs that define various processing procedures, and required data.

Upon receiving data, the source identification unit 25a extracts the source address of the data. Various operations executed by the source identification unit 25a may be the same as those executed by the source identification unit 15a discussed in the second embodiment, and therefore detailed discussion thereof is omitted.

The first port identification unit 25b extracts, from the partition ID table 23, a partition ID associated with the reception port ID. The first port identification unit 25b then extracts, from the partition ID table 23, port IDs associated with the extracted partition ID, that are different from the reception port ID.

An example will be discussed in which the data DT_B having the source address "MAC_B" is received via the port P4 and the source identification unit 25a outputs the data DT_B to the first port identification unit 25b. In this case, the first port identification unit 25b extracts, from the partition ID table 23, the partition ID "001101" associated with the reception port ID "P4". Next, the first port identification unit 25b extracts, from the partition ID table 23, port IDs other than the reception port ID "P4", from among port IDs associated with the partition ID "001101", namely the port IDs "P1" and "P3". Thereafter, the first port identification unit 25b outputs the reception port ID "P4", the data DT_B having the source address "MAC_B", the partition ID "001101", and the extracted port IDs "P1" and "P3", to the second port identification unit 25c.

The second port identification unit 25c extracts, from the network ID table 22, network IDs associated with any of the port IDs extracted by the first port identification unit 25b. The second port identification unit 25c then extracts, from the network ID table 22, port IDs associated with any of the extracted network IDs. Furthermore, the second port identification unit 25c extracts, from the partition ID table 23, port IDs associated with a partition ID different from the partition ID extracted by the first port identification unit 25b, from among the extracted port IDs.

In the case of the above-discussed data DT_B, the second port identification unit 25c extracts, from the network ID table 22, the network ID "00000011" associated with the port ID "P1" extracted by the first port identification unit 25b. Similarly, the second port identification unit 25c extracts, from the network ID table 22, the network ID "00000100" associated with the port ID "P3" extracted by the first port identification unit 25b.

The second port identification unit 25c then extracts, from the network ID table 22, the port ID associated with the network ID "00000011" which is associated with the port ID "P1", namely the port ID "P2". In addition, the second port identification unit 25c determines that there is no port ID associated with the network ID "00000100" which is associated with the port ID "P3".

Thereafter, the second port identification unit 25c extracts, from the partition ID table 23, the partition ID "110010" associated with the extracted port ID "P2". Since the partition ID extracted by the first port identification unit 25b is "001101" and the partition ID associated with the port ID "P2" is "110010", the second port identification unit 25c determines to learn the port ID "P2". The second port identification unit 25c then outputs the port ID "P2", the port ID "P4", the source address "MAC_B", and the data DT_B to the storage control unit 25d.

When the information such as the source address received from the second port identification unit 25c has not been learned or when the learned data such as the source address needs to be updated, the storage control unit 25d learns the received information and then outputs the information to the switching control unit 26. When the information such as the source address received from the second port identification unit 25c has already been learned and when the learned data such as the source address does not need to be updated, the storage control unit 25d outputs the information to the switching control unit 26 without learning the received information.

For example, suppose that the storage control unit 25d has received the port ID "P4", the port ID "P2", the source address "MAC_B", and the data DT_B from the second port identification unit 25c when "MAC_C, P3" is stored in the MAC table 24 as illustrated in the left part of FIG. 8. In this case, since information regarding the correspondence between the address "MAC_B" and the port IDs "P4" and "P2" is not stored in the MAC table 24, the storage control unit 25d determines that the information has not been learned. The storage control unit 25d then stores, in the MAC table 24, "MAC_B, P2, P4" as a new record indicating the address and the port IDs as illustrated in the right part of FIG. 8. Thereafter, the storage control unit 25d sends the information such as the data and the address received from the second port identification unit 25c to the switching control unit 26.

When the port IDs and the source address received from the second port identification unit 25c have been stored in the MAC table 24 in association with each other, the storage control unit 25d determines that the information has been learned. Upon determining that the information has been learned, the storage control unit 25d sends the information such as the data and the address received from the second port identification unit 25c to the switching control unit 26 without learning the information.

In addition, suppose that the storage control unit 25d has received the port ID "P3", the port ID "P1", and the data DT_C having the source address "MAC_C" from the second port identification unit 25c when the MAC table 24 is in the state illustrated in the left part of FIG. 8. In this case, since information regarding the address "MAC_C" is stored in the MAC table 24 but the stored port ID is different from the received port IDs, the storage control unit 25d determines that the learned data needs to be updated. The storage control unit 25d then overwrites "MAC_C, P3", which is the address and the port ID that have already been stored, with "MAC_C, P1, P3". Thereafter, the storage control unit 25d sends the information such as the data and the address received from the second port identification unit 25c to the switching control unit 26.

The switching control unit 26 switches the data, that is, transfers the received data to the destination. Specific operations executed by the switching control unit 26 may be the same as those executed by the switching control unit 16 discussed in the second embodiment, and therefore detailed discussion thereof is omitted.

Operation Flow of Learning Process Executed by Switch

FIG. 9 illustrates an exemplary operation flow of a learning process executed by the switch according to the present embodiment.

In S201, the source identification unit 25a of the switch 20 waits for receiving data.

In S202, upon receiving data ("Yes" in S201), the source identification unit 25a of the switch 20 extracts a source address from the received data.

In S203, the first port identification unit 25b acquires a reception port ID of the reception port via which the data has been received.

In S204, the first port identification unit 25b extracts a partition ID associated with the reception port ID from the partition ID table 23.

In S205, the first port identification unit 25b extracts port IDs, other than the reception port ID, associated with the extracted partition ID from the partition ID table 23.

In S206, the second port identification unit 25c extracts, from the network ID table 22, network IDs associated with any of the port IDs extracted by the first port identification unit 25b.

In S207, the second port identification unit 25c extracts, from the network ID table 22, port IDs associated with any of the network IDs extracted in S206.

In S208, the second port identification unit 25c refers to the partition ID table 23 and extracts, from among the port IDs extracted in S207, port IDs associated with any of partition IDs different from the partition ID extracted in S204.

In S209, the storage control unit 25d determines whether the received data needs to be learned, that is, whether the source address of the received data has been learned or whether the learned data needs to be updated.

In S210, when it has been determined that the source address has not been learned or that the learned data needs to be updated ("Yes" in S209), the storage control unit 25d learns the source address and the port IDs. That is, the storage control unit 25d stores the address extracted in S202, the port ID acquired in S203, and the port IDs extracted in S208 in association with one another in the MAC table 24.

When it has been determined that the source address has been learned and that the learned data does not need to be updated ("No" in S209), the switch 20 advances the process to S211 without executing S210.

In S211, the switching control unit 26 switches the data, that is, transmits the data to the destination.

Advantageous Effects of Third Embodiment

In a conventional method for learning partition information, the MAC table is created for each partition and partition information is stored in the MAC table. For example, when a switch has four partitions, each MAC table (entry) is configured to have two-bit information.

As a result, a large-capacity MAC table may be prepared and a region in which the large-capacity MAC table is arranged may be provided on a system board. Therefore, cost of hardware increases in the conventional method for learning partition information. Furthermore, since the same addresses need to be learned for each partition, a lot of table entries are consumed, thereby decreasing the use efficiency.

According to the third embodiment, when learning an address, the switch 20 may learn the following ports in addition to a reception port. That is, the switch 20 may learn ports that are connected to the same networks as that connected to ports that belong to the same partition as that the reception port belongs to, but that belong to partitions different from one to which the reception port belongs. Therefore, even when the switch 20 has received data destined for a learned address via a port that belongs to a partition different from that to which the reception port belongs, the switch 20 may identify the destination port, thereby making it unnecessary to cause flooding. As a result, it is possible to execute an efficient data relay process in which flooding is prevented.

In addition, when learning an address, the switch 20 does not learn partition information nor provide an individual table for each partition. Therefore, since the partition information and bit information need not be provided, the number of entries may be suppressed, thereby reducing the cost of hardware.

Fourth Embodiment

The second embodiment and the third embodiment may be combined to realize another embodiment. In the fourth embodiment, an exemplary learning process in which the learning processes of the second embodiment and the third embodiment are combined will be discussed. A switch according to the fourth embodiment may be realized by, for example, the same functional configuration as that of the switch 20 discussed in the third embodiment, and therefore detailed discussion thereof is omitted here. The fourth embodiment will be discussed with reference to the switch 20 illustrated in FIG. 7.

Figure 10:
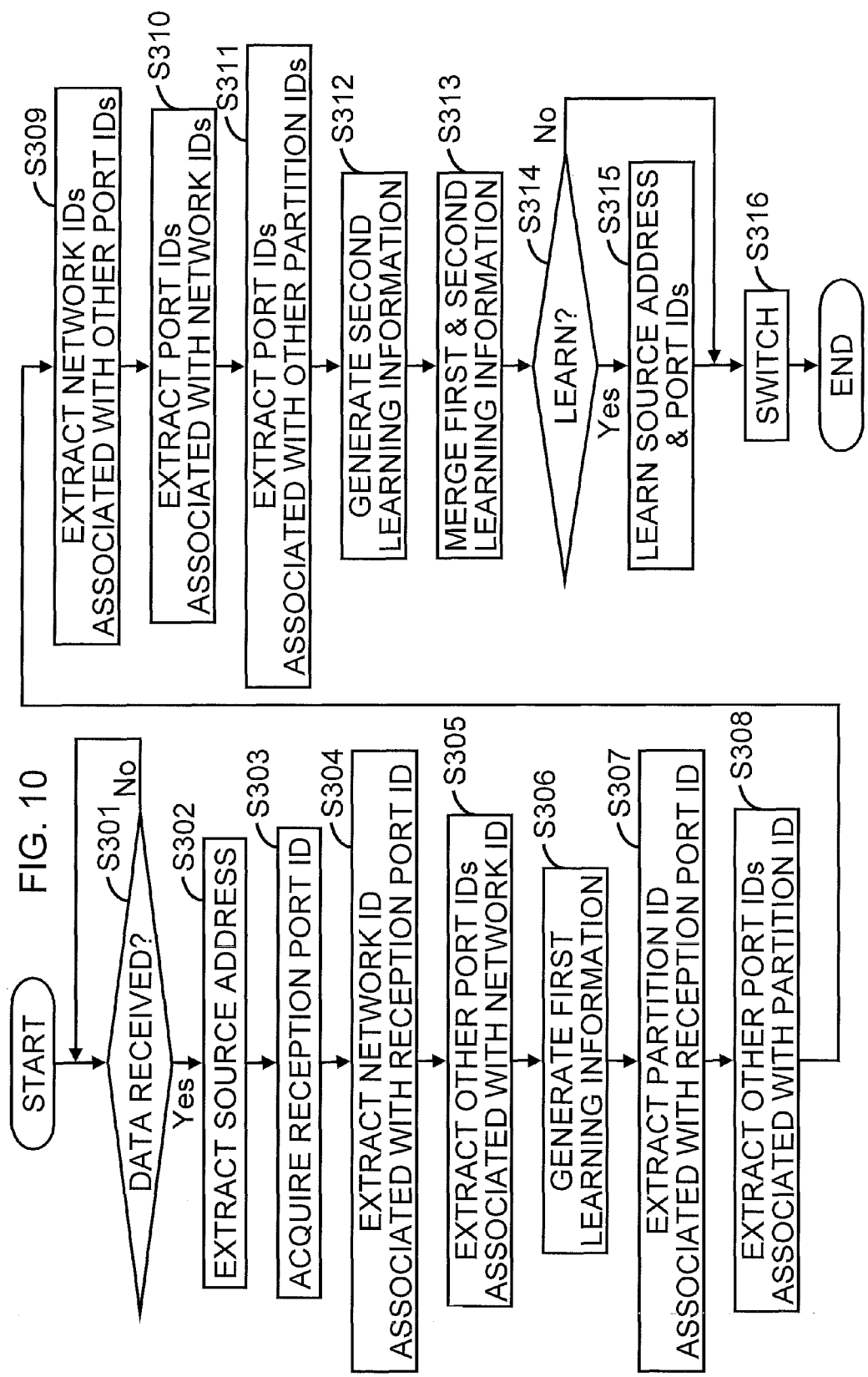
FIG. 10 is a diagram illustrating an exemplary operation flow of a learning process executed by a switch according to an embodiment of the present invention.

FIG. 10 illustrates an exemplary operation flow of a learning process executed by the switch according to the present embodiment.

In S301, the source identification unit 25a of the switch 20 waits for receiving data.

In S302, upon receiving data ("Yes" in S301), the source identification unit 25a of the switch 20 extracts a source address from the received data.

In S303, the source identification unit 25a acquires a reception port ID of the reception port via which the data has been received.

In S304, the first port identification unit 25b extracts, from the network ID table 22, a network ID associated with the reception port ID acquired by the source identification unit 25a.

In S305, the second port identification unit 25c extracts port IDs, other than the reception port ID, associated with the extracted network ID from the network ID table 12.

In S306, the storage control unit 25d generates first learning information by associating the source address extracted in S302, the reception port ID acquired in S303, and the port IDs extracted in S305 with one another.

In S307, the first port identification unit 25b extracts a partition ID associated with the reception port ID from the partition ID table 23.

In S308, the first port identification unit 25b extracts port IDs, other than the reception port ID, associated with the extracted partition ID from the partition ID table 23.

In S309, the second port identification unit 25c extracts, from the network ID table 22, network IDs associated with any of the port IDs extracted by the first port identification unit 25b.

In S310, the second port identification unit 25c extracts, from the network ID table 22, port IDs associated with any of the network IDs extracted in S309.

In S311, the second port identification unit 25c refers to the partition ID table 23 and extracts, from among the port IDs extracted in S310, port IDs associated with any of partition IDs different from the partition ID extracted in S307.

In S312, the storage control unit 25d generates second learning information by associating the source address, the reception port ID, and the port IDs of the ports extracted in S311 with one another.

In S313, the storage control unit 25d merges the first learning information generated in S306 and the second learning information generated in S312. That is, the storage control unit 25*d* generates third learning information by associating the source address and the port IDs included in the first learning information and the second learning information with one another.

In S314, the storage control unit 25*d* determines whether the third learning information needs to be learned, that is, whether the source address has been learned or whether the learned data needs to be updated. In other words, the storage control unit 25*d* determines whether information regarding the correspondence between the source address and the port IDs included in the third learning information is stored in the MAC table 24.

In S315, when it has been determined that the source address has not been learned or that the learned data needs to be updated ("Yes" in S314), the storage control unit 25*d* learns the third learning information.

In S316, the switching control unit 26 switches the data, that is, transmits the data to the destination.

When it has been determined that the source address has been learned and that the learned data does not need to be updated ("No" in S314), the switch 20 advances the process to S316 without executing S315.

According to the fourth embodiment, when learning an address, the switch 20 may learn a reception port and other ports connected to the same network as that the reception port is connected to, in association with the address. Furthermore, the switch 20 may learn ports that are connected to the same networks as that connected to ports that belong to the same partition as that the reception port belongs to, but that belong to partitions different from one to which the reception port belongs. As a result, more ports may be associated with an address in one learning, and therefore the advantageous effects of the second embodiment and the third embodiment may be realized at the same time in the subsequent switching process.

Fifth Embodiment

Although some embodiments of the present invention have been discussed above, the present invention may be implemented in various different modes other than the above-discussed embodiments. Other embodiments will be discussed hereinafter.

System

Among the operations discussed in the above embodiments, some or all of the operations discussed as to be executed automatically may be executed manually. In addition, some or all of the operations discussed as to be executed manually may be executed automatically using known methods. Furthermore, the operation flows, the control procedures, the specific names discussed herein or illustrated in the drawings, the information including, for example, various pieces of data and parameters illustrated in FIGS. 3 to 5, 8, and the like may be arbitrarily changed unless otherwise specified.

The components of each apparatus illustrated in the drawings are conceptualized in terms of the functions and therefore need not be physically configured as illustrated in the drawings. That is, specific forms of distribution and integration of each apparatus are not limited to those illustrated in the drawings. For example, the network identification unit 15*b* and the port identification unit 15*c* may be integrated. That is, each apparatus may be configured by functionally or physically distributing or integrating some or all of the components thereof in a certain unit in accordance with various types of loads or usage. Furthermore, the entirety or any part of each processing function to be executed by each apparatus may be realized by a central processing unit (CPU) and a program to be analyzed and executed by the CPU or by hardware adopting a wired logic.

Program

The processes discussed in the above embodiments may be realized by executing a program prepared in advance on a computer system such as a personal computer or a work station. An exemplary computer system that executes a program having the same functions as the above embodiments will be discussed hereinafter.

Figure 11:
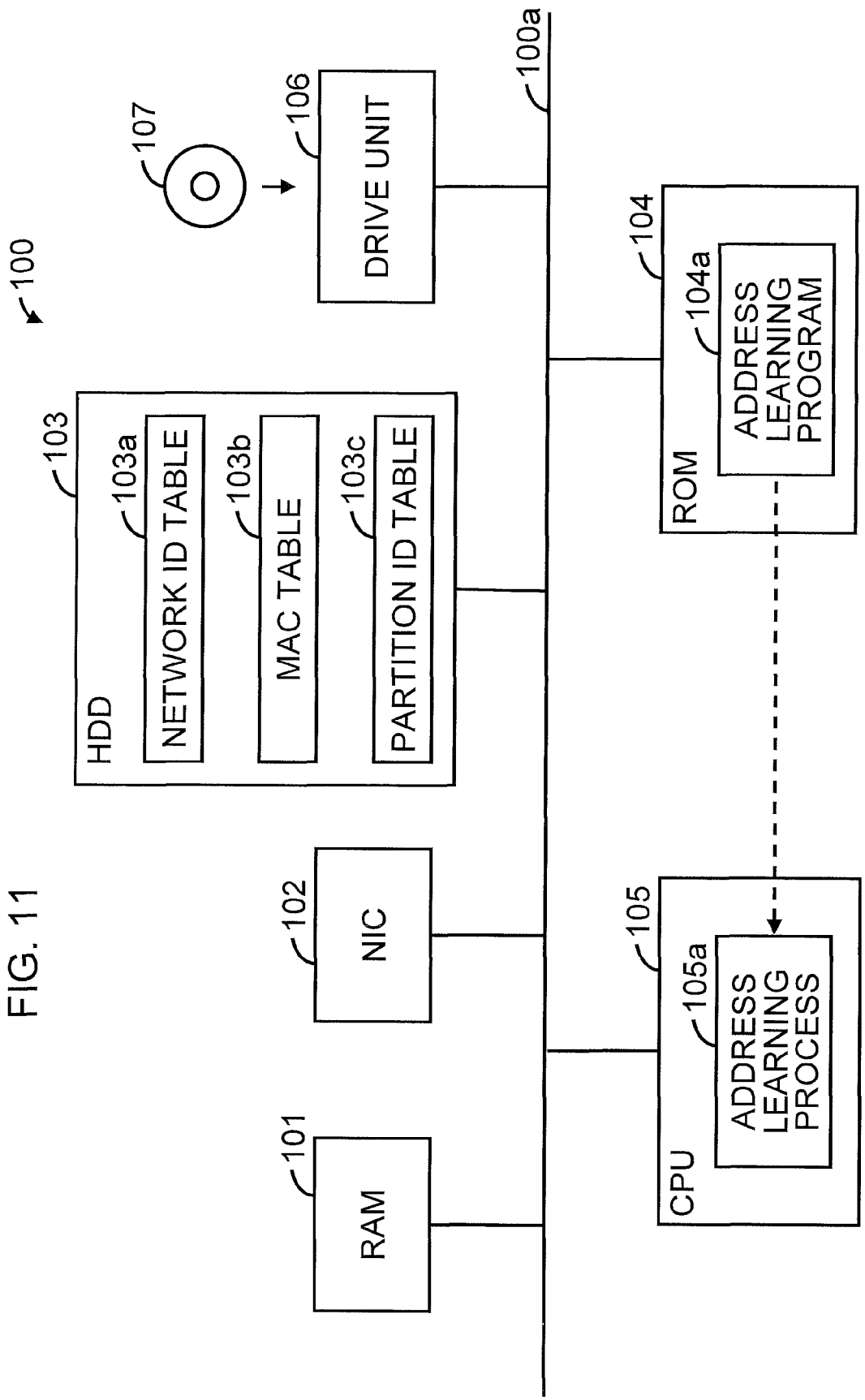
FIG. 11 is a diagram illustrating an exemplary computer system that executes an address learning program.
Figure 12:
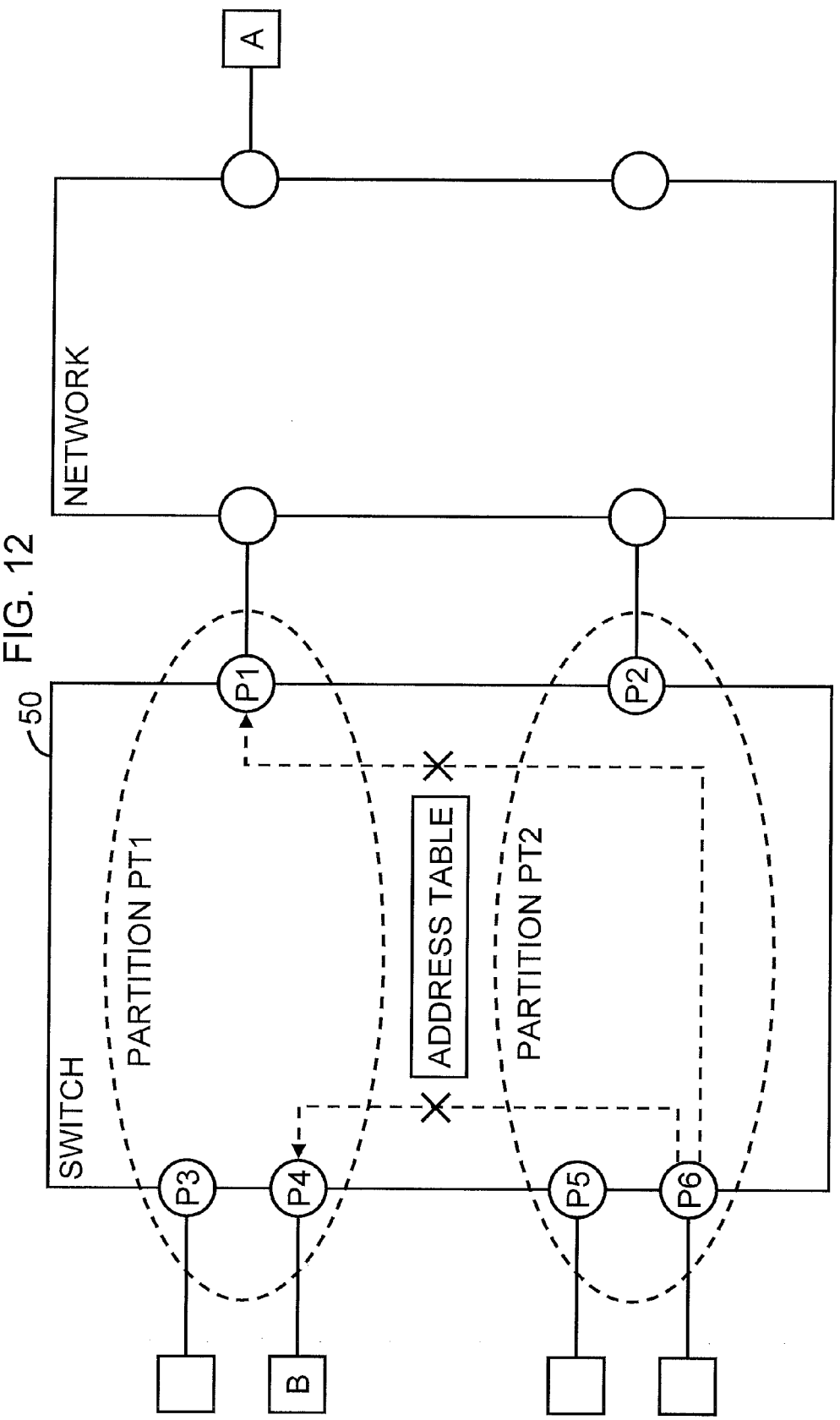
FIG. 12 is a diagram illustrating exemplary partitioning of a switch.

FIG. 11 illustrates an exemplary computer system that executes an address learning program. As illustrated in FIG. 11, a computer system 100 includes a CPU 105, a read-only memory (ROM) 104, a random-access memory (RAM) 101, a network interface card (NIC) 102, a hard disk drive (HDD) 103, and a drive unit 106 for reading data from and/or writing data to a computer-readable medium 107. These components are connected to a bus 100*a*. The HDD 103 stores a network ID table 103*a*, a MAC table 103*b*, and a partition ID table 103*c* having the same functions as the tables illustrated in FIG. 2 or 7.

The ROM 104 holds an address learning program 104*a*. Although the ROM 104 is used as an example of a recording medium, various programs may be stored in another recording medium that may be read by a computer, such as an HDD, a RAM, or a compact disc read-only memory (CD-ROM), and may be read by the computer. A recording medium may be arranged at a distant location and the computer may obtain and use programs by accessing the recording medium. At this time, the obtained programs may be stored in a recording medium of the computer and used. The programs may be stored, when delivered, in the computer-readable medium 107 such as a compact disc (CD), the CD-ROM, CD recordable (CD-R), CD rewritable (CD-RW) or the like, a digital versatile disc (DVD), DVD-ROM, DVD-RAM, DVD-R, DVD plus R (DVD+R), DVD-RW, DVD plus RW (DVD+RW), HD DVD or the like, a Blu-ray disc, a magnetic disk, an optical disc, or a magneto-optical disc. The programs are installed onto the HDD 103 from the computer-readable medium 107, and loaded into the RAM 101 from the HDD 103 when executed by the CPU 105.

The CPU 105 executes, as an address learning process 105*a*, the functions discussed with reference to FIG. 2 or 7 by reading and executing the address learning program 104*a*. That is, the CPU 105 executes the same functions as the control unit 15 or the control unit 25. In addition, the CPU 105 may execute the same functions as the switching control unit 16 or the switching control unit 26. Thus, the computer system 100 operates as a communication processing apparatus that executes an address learning method by reading and executing a program from the ROM 104.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A communication processing apparatus comprising:
a first storage unit to store, for a plurality of port identifiers, a port identifier and a network identifier in association with each other, the port identifier identifying a port among a plurality of ports and the network identifier identifying a network connected to the port;
a second storage unit to store address information and a set of port identifiers in association with each other, the address information identifying an apparatus connected to the port, the set of port identifiers including the port identifier identifying the port;
a third storage unit for storing, for each of the plurality of port identifiers, a port identifier for identifying a port included in a partition and a partition identifier in association with each other, the partition being a part of the plurality of ports, the partition identifier being for identifying the partition; and
a processor to
extract, upon receiving data via a reception port among the plurality of ports, a first network identifier associated with a first port identifier identifying the reception port from the first storage unit,
extract second port identifiers associated with the extracted first network identifier from the first storage unit, the second port identifiers being different from the first port identifier,
store source address information of the received data and a first set of port identifiers in association with each other in the second storage unit, the source address information being address information of an apparatus that has transmitted the received data, the first set of port identifiers including the first port identifier and the extracted second port identifiers
extract a first partition identifier associated with the first port identifier from the third storage unit,
extract third port identifiers associated with the extracted first partition identifier from the third storage unit, the third port identifiers being different from the first port identifier,
extract second network identifiers associated with any of the extracted third port identifiers from the first storage unit, and
extract fourth port identifiers associated with any of the extracted second network identifiers from the first storage unit, the fourth port identifiers being stored in the third storage unit in association with second partition identifiers, the second partition identifiers being different from the first partition identifier, and
wherein the first set of port identifiers further includes the extracted fourth port identifiers.

2. The communication processing apparatus according to claim 1, wherein
the processor stores the source address information and the first set of port identifiers in the second storage unit in an absence of the source address information in the second storage unit or when a second set of port identifiers which has been stored in the second storage unit in association with the source address information conflicts with the first set of port identifiers.

3. The communication processing apparatus according to claim 1, wherein
the processor
determines whether the destination address information has been stored in the second storage unit,
extracts a second set of port identifiers associated with the destination address information from the second storage unit when it is determined that the destination address information has been stored in the second storage unit,
extracts a fifth port identifier from the extracted second set of port identifiers, the fifth port identifier being different from the first port identifier, the fifth port identifier being stored in the third storage unit in association with the first partition identifier, and
transmits the received data via a port identified by the extracted fifth port identifier.

4. The communication processing apparatus according to claim 3, wherein
the processor
extracts sixth port identifiers associated with the first partition identifier from the third storage unit when it is determined that the destination address information has not been stored in the second storage unit, each of the sixth port identifiers being different from the first port identifier, and
transmits the received data via ports identified by any of the extracted sixth port identifiers.

5. A communication processing apparatus comprising:
a first storage unit to store, for each of a plurality of port identifiers, a port identifier and a network identifier in association with each other, the port identifier identifying a port among a plurality of ports and the network identifier identifying a network connected to the port;
a second storage unit to store address information and a set of port identifiers in association with each other, the address information identifying an apparatus connected to the port and the set of port identifiers including the port identifier identifying the port;
a third storage unit to store, for each of the plurality of port identifiers, a port identifier a port included in a partition and a partition identifier in association with each other, the partition being a part of the plurality of ports, the partition identifier identifying the partition, and
a processor to
extract, upon receiving data via a reception port among the plurality of ports, a first partition identifier associated with a first port identifier identifying the reception port from the third storage unit,
extract second port identifiers associated with the extracted first partition identifier from the third storage unit, the second port identifiers being different from the first port identifier,
extract first network identifiers associated with any of the extracted second port identifiers from the first storage unit,
extract third port identifiers associated with any of the extracted first network identifiers from the first storage unit, the third port identifiers stored in the third storage unit in association with second partition identifiers, the second partition identifiers being different from the first partition identifier, and
store source address information of the received data and a first set of port identifiers in association with each other in the second storage unit, the source address information being address information of an apparatus that has transmitted the received data, the first set of port identifiers including the first port identifier and the extracted third port identifiers.

6. A computer readable, non-transitory medium storing an address learning program that causes a computer to execute an address learning process comprising:
extracting, upon receiving data via a reception port among a plurality of ports, a first network identifier associated with a first port identifier identifying the reception port from a first storage unit, the first storage unit storing a port identifier identifying a port among the plurality of ports and a network identifier identifying a network connected to the port in association with each other for the plurality of ports;

extracting second port identifiers associated with the extracted first network identifier from the first storage unit, the second port identifiers being different from the first port identifier;

storing source address information of the received data and a first set of port identifiers in association with each other in a second storage unit, the source address information being address information of an apparatus that has transmitted the received data, the first set of port identifiers including the first port identifier and the extracted second port identifiers;

extracting a first partition identifier associated with the first port identifier from a third storage unit, the third storage unit storing a port identifier identifying a port in a partition and a partition identifier in association with each other, the partition being a part of the plurality of ports and the partition identifier identifying the partition;

extracting third port identifiers associated with the extracted first partition identifier from the third storage unit, the third port identifiers being different from the first port identifier;

extracting second network identifiers associated with any of the extracted third port identifiers from the first storage unit; and extracting fourth port identifiers associated with any of the extracted second network identifiers from the first storage unit, the fourth port identifiers stored in the third storage unit in association with second partition identifiers, the second partition identifiers being different from the first partition identifier, wherein the first set of port identifiers includes the extracted fourth port identifiers.

7. The computer readable, non-transitory medium according to claim 6, wherein the source address information and the first set of port identifiers are stored in the second storage unit in an absence of the source address information in the second storage unit or when a second set of port identifiers which has been stored in the second storage unit in association with the source address information conflicts with the first set of port identifiers.

8. The computer readable, non-transitory medium according to claim 6, the address learning process further comprising:

determining whether the destination address information has been stored in the second storage unit;

extracting a second set of port identifiers associated with the destination address information from the second storage unit when it is determined that the destination address information has been stored in the second storage unit;

extracting a fifth port identifier from the extracted second set of port identifiers, the fifth port identifier being different from the first port identifier, the fifth port identifier being stored in the third storage unit in association with the first partition identifier; and transmitting the received data via a port identified by the extracted fifth port identifier.

9. The computer readable, non-transitory medium according to claim 8, the address learning process further comprising:

extracting sixth port identifiers associated with the first partition identifier from the third storage unit when it is determined that the destination address information has not been stored in the second storage unit, each of the sixth port identifiers being different from the first port identifier; and transmitting the received data via ports identified by any of the extracted sixth port identifiers.

10. A computer readable, non-transitory medium storing an address learning program that causes a computer to execute an address learning method comprising:

extracting, upon receiving data via a reception port among a plurality of ports, a first partition identifier associated with a first port identifier identifying the reception port from a first storage unit, the first storage unit storing a port identifier identifying a port included in a partition and a partition identifier identifying the partition in association with each other, the partition being a part of the plurality of ports;

extracting second port identifiers associated with the extracted first partition identifier from the first storage unit, the second port identifiers being different from the first port identifier;

extracting first network identifiers associated with any of the extracted second port identifiers from a second storage unit, the second storage unit storing a port identifier identifying one port among the plurality of ports and a network identifier identifying a network connected to the one port in association with each other for each of the plurality of ports;

extracting third port identifiers associated with any of the extracted first network identifiers from the second storage unit, the third port identifiers being stored in the first storage unit in association with second partition identifiers, the second partition identifiers being different from the first partition identifier; and storing source address information of the received data and a first set of port identifiers in association with each other in a third storage unit, the source address information being address information of an apparatus that has transmitted the received data, and wherein the first set of port identifiers including the first port identifier and the extracted third port identifiers.

11. An address learning method executed by a communication processing apparatus, the address learning method comprising:

extracting, upon receiving data via a reception port among a plurality of ports, a first partition identifier associated with a first port identifier identifying the reception port from a first storage unit, the first storage unit storing a port identifier identifying a port included in a partition in association with a partition identifier identifying the partition in association, the partition being a part of the plurality of ports;

extracting second port identifiers associated with the extracted first partition identifier from the first storage unit, the second port identifiers being different from the first port identifier;

extracting first network identifiers associated with any of the extracted second port identifiers from a second storage unit, the second storage unit storing a port identifier identifying one port among the plurality of ports in association with a network identifier identifying a network connected to the one port for each of the plurality of ports;

extracting third port identifiers associated with any of the extracted first network identifiers from the second storage unit, the third port identifiers being stored in the first storage unit in association with second partition identifiers, the second partition identifiers being different from the first partition identifier; and storing, by the communication processing apparatus, source address information of the received data and a first set of port identifiers in association with each other in a third storage unit, the source address information being address information of an apparatus that has transmitted the received data, and wherein the first set of port identifiers including the first port identifier and the extracted third port identifiers.

* * * * *

UNITED STATES PATENT AND TRADEMARK OFFICE
CERTIFICATE OF CORRECTION

| | |
|---|---|
| PATENT NO. | : 8,804,715 B2 |
| APPLICATION NO. | : 13/332775 |
| DATED | : August 12, 2014 |
| INVENTOR(S) | : Osamu Shiraki |

Page 1 of 1

It is certified that error appears in the above-identified patent and that said Letters Patent is hereby corrected as shown below:

In the Claims

Column 18, Line 34, In Claim 5, Delete "identifier a port" and insert -- identifier for identifying a port --, therefor.

Signed and Sealed this
Eighteenth Day of November, 2014

Michelle K. Lee
*Deputy Director of the United States Patent and Trademark Office*